Jan. 10, 1939.　　K. L. HERTEL　　2,143,775
PARTIAL PRESSURE INDICATOR
Filed Feb. 19, 1934　　2 Sheets-Sheet 1

INVENTOR
KENNETH L HERTEL,
by Stone, Boyden Mack, ATTORNEYS

Jan. 10, 1939.　　　　K. L. HERTEL　　　　2,143,775
PARTIAL PRESSURE INDICATOR
Filed Feb. 19, 1934　　　2 Sheets-Sheet 2
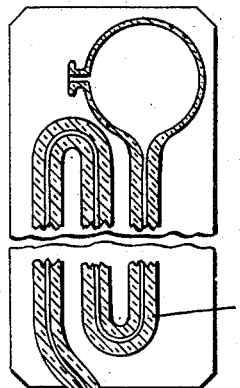
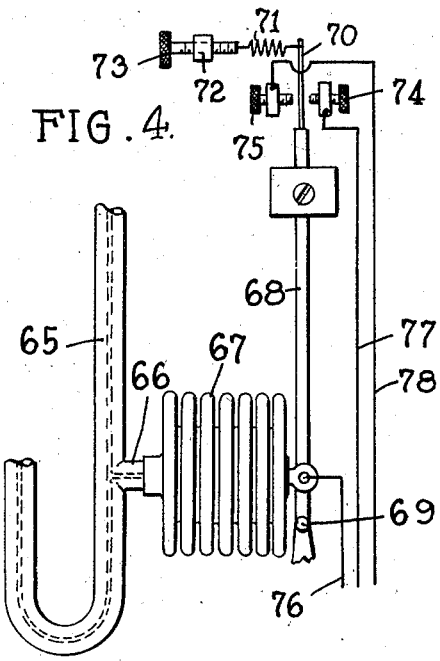
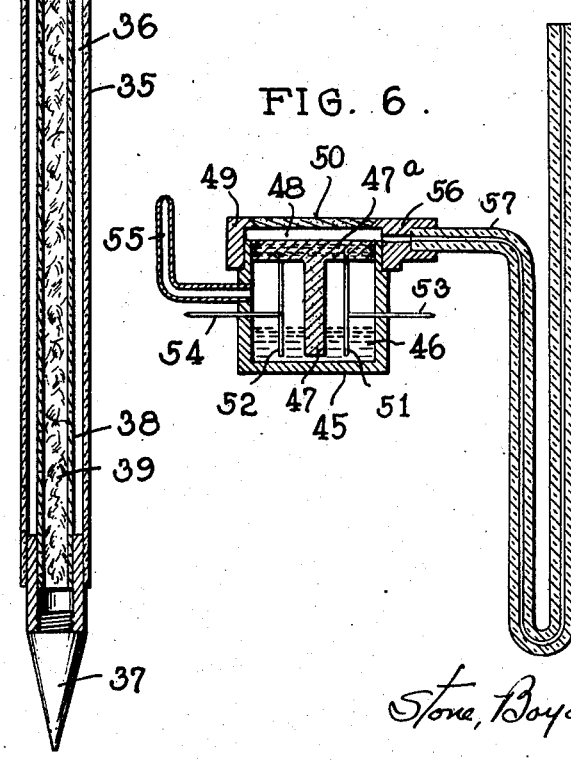
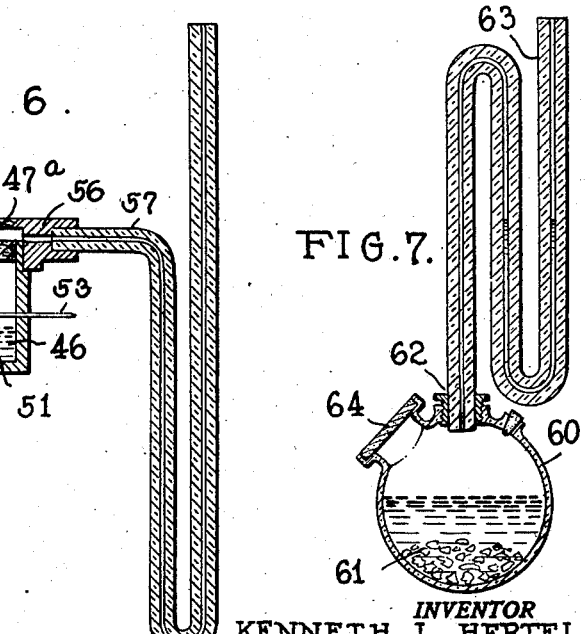
INVENTOR
KENNETH L. HERTEL
BY
Stone, Boyden Mack, ATTORNEYS Patented Jan. 10, 1939

2,143,775

UNITED STATES PATENT OFFICE 2,143,775

PARTIAL PRESSURE INDICATOR

Kenneth L. Hertel, Knoxville, Tenn., assignor to The University of Tennessee Research Corporation, Knoxville, Tenn., a corporation of Tennessee Application February 19, 1934, Serial No. 712,030

5 Claims. (Cl. 73—335)

This invention relates to apparatus for indicating the partial pressure of a gas or vapor in an atmosphere.

In one form, the invention relates to apparatus adapted to indicate the partial pressure of a vapor in an atmosphere with a view to determining the percentage of saturation. In this form, the device is particularly adapted for measuring relative humidity.

The fundamental principles of operation of the present invention are the same in each of the embodiments. A closed chamber is provided having a porous wall of such nature that the atmosphere outside the chamber may slowly diffuse into the chamber and likewise the atmosphere within the chamber may slowly diffuse out through the wall. A highly sensitive manometer or other pressure responsive device is connected in communication with the closed chamber and suitably graduated to indicate the difference in pressure between the atmosphere within the chamber and the atmosphere outside the chamber.

It is fundamental in the law of gases that the total pressure exerted by a mixture of gases, or gases and vapors, is equal to the sum of the pressures of the constituents, the pressure of any one constituent being designated as the partial pressure of that constituent.

It has heretofore been proposed to provide a compound atmosphere communicating with one arm of the manometer in which atmosphere there is a known or determinable partial pressure exerted by one constituent. Due to diffusion through the porous wall, this atmosphere is, in respect to the partial pressures of the other constituents, identical to the atmosphere or gaseous mixture, the properties of which are being measured, and with which the other arm of the manometer column communicates. The pressure difference registered by the manometer therefore will indicate the partial pressure in the outer atmosphere of the particular constituent being measured. This is, of course, because the partial pressures of each of the constituents in one atmosphere are due to diffusion, exactly equal to the partial pressures of the same respective constituents in the other atmosphere with the exception of the particular gas or vapor, the partial pressure of which is being determined. In the case of this gas or vapor, its partial pressure is known or determinable in the atmosphere within the instrument while in the atmosphere outside the instrument, it is unknown and may possibly be quite different.

Apparatus operating on the above principles is disclosed and broadly claimed in application Serial No. 6,534, filed February 14, 1935, by Perry Okey, with which application the present application was involved in an interference in which applicant conceded priority of invention to said Perry Okey.

In the Okey apparatus, means were provided for maintaining the atmosphere within the closed chamber in substantially vapor saturated condition, the vapor pressure in such saturated atmosphere serving as a standard with which the partial pressure of the vapor in the outside atmosphere was compared.

An object of the present invention is to provide means whereby the standard atmosphere inside the chamber may be maintained at a known degree of saturation substantially less than 100%, and to compare the partial pressure of the vapor in this atmosphere with that of the vapor in the outside atmosphere. By devising the above means in such a manner that the known degree of saturation of the standard atmosphere is nearly equal to the average range of that of the outside atmosphere, a very sensitive instrument is obtained.

A further object of the invention is to provide thermostatic means in cooperation with the partial pressure indicating instrument, whereby the readings thereof will indicate directly the relative humidity of the atmosphere to which the instrument is exposed.

Still other and further objects of the invention will become apparent from the following specification when considered in connection with the accompanying drawings.

In the drawings:

Fig. 4 illustrates a pressure responsive device connected with the manometer tube and serving to control an electric circuit in accordance with variations in the pressure.

Fig. 5 is a modified form of the instrument which has a chamber containing absorbent material;

Fig. 6 is a sectional view of a form of the invention in which a chamber is provided with means for maintaining it devoid of vapor; and Fig. 7 is a sectional view of a still further modified form of the invention illustrating another means for maintaining the atmosphere within the instrument in standard condition of saturation substantially less than 100%;

Figure 1:
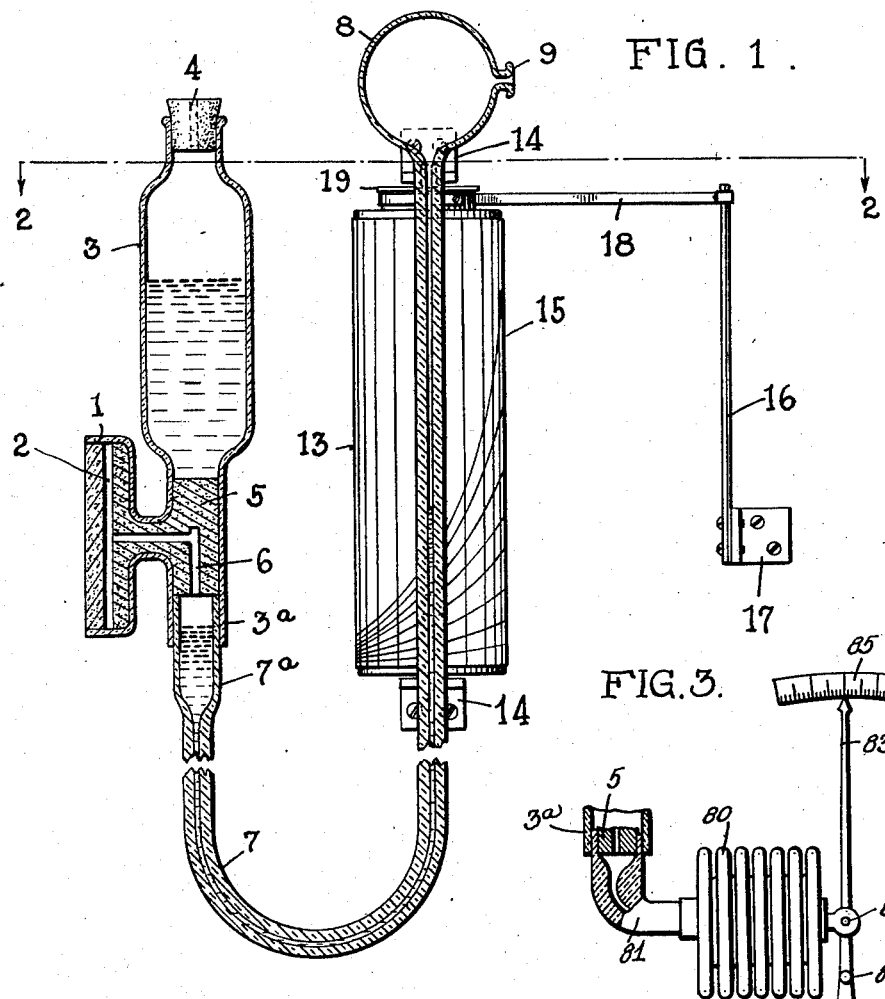
Fig. 1 is a front elevation of one form of the invention the chamber and manometer being shown in section.

With more particular reference to the drawings, the apparatus shown in Fig. 1 consists of a closed chamber 1, having a porous wall 2, which is preferably made of magnesium carbonate, powdered silica and water glass, earthenware or some other equivalent porous material which is exposed to or surrounded by the outer atmosphere and which will slowly permit the diffusion of the gases and vapors from the outer atmosphere into the chamber and likewise from the chamber outward into the outer atmosphere. In communication with the chamber 1 is a reservoir 3 adapted to contain water, or other suitable liquid, this reservoir being open at its upper end to permit filling, and provided with a suitable stopper 4.

In order to prevent direct communication between the reservoir 3 and the chamber 1 and to provide means for maintaining the atmosphere within the chamber in vapor saturated condition, the passageway between the reservoir and the chamber is filled with magnesium carbonate or other porous material 5, of a nature similar to the material of which the wall 2 is made. This material constitutes the entire rear wall of the chamber 1, and provides a large exposed surface. The liquid in the reservoir 3 infiltrates down through the porous material 5 and exudes from the pores thereof thus maintaining the surface thereof moist at all times. The presence of this relatively large exposed moist surface within the chamber from which the liquid constantly evaporates serves to maintain the atmosphere therein continuously in saturated condition.

As will be hereafter seen, it is essential that the structure and size of the porous wall 2 is of such a nature that the diffusion of the atmosphere therethrough is slower than the rate at which the liquid vapor is generated by evaporation from the exposed surface of the porous mass 5 so that the atmosphere within the instrument chamber may always be maintained in saturated condition despite the diffusion through the wall 2 of outside atmosphere into the chamber. A passageway 6 is provided from the chamber 1 through the porous material 5 and extends downwardly opening into a socket 3ª in which is inserted one end of a manometer 7, so that the pressure of the atmosphpere in the chamber 1 is exerted directly upon the surface of the manometric fluid.

The manometer tube 7 has provided in the arm which connects with the socket 3ª an enlarged portion or reservoir 7ª, which is sufficiently large in relation to the inside diameter of the manometer tube so that changes in level in the fluid in the other arm of the manometer will not materially affect the level of the manometric fluid in the reservoir 7ª. Therefore, in order to read the difference in level of the fluid in the two arms of the manometer, it is only necessary to read the level in one arm because the level in the other arm, due to the reservoir 7ª, remains at a constant for all practical purposes.

The manometer fluid in this type of instrument may be any low vapor pressure liquid which will not dissolve the liquid in the reservoir 3, and if this is water, stable organic liquids such as butyl phthalate or amyl phthalate may be used. The other end of the manometer tube 7 after being carried upwardly a sufficient distance, is preferably provided with a globe 8 at its upper end to prevent spilling of the manometric fluid and has an opening 9 to give the outer atmosphere access thereto. It will be seen from the foregoing that the atmosphere within the chamber 1 is maintained in a condition of complete saturation notwithstanding diffusion through the porous wall 2.

Due to this diffusion through the porous wall 2, it will be seen that the atmosphere inside and outside of the chamber 1 are identical in respect to the partial pressure of each of their constituents with the exception of the partial pressure exerted by the water or other vapor being measured, which, of course, will be constantly maintained greater in the saturated atmosphere in the chamber. Hence, the difference in levels of the liquid in the two arms of the manometer tube which corresponds with the difference in the total existing pressures will indicate the difference between the partial pressure exerted by the vapor in the saturated atmosphere on one end and the partial pressure of the similar vapor in the outside atmosphere on the other end. This difference in partial pressures between a vapor saturated atmosphere and a partially vapor saturated atmosphere, when expressed in terms of percentage of complete saturation, is known as the saturation deficit. This saturation deficit, when applied to water vapor, is the difference between 100% and the relative humidity expressed in percent.

The reading which of course represents the difference in levels in the two arms of the manometer therefore indicates the saturation deficit of the atmosphere surrounding the instrument.

In apparatus of this general character which has been previously proposed, as shown for example, in the above mentioned application of Perry Okey, the porous wall is a cylinder of relatively large area, and a fan is employed to circulate the outer atmosphere continuously past such porous wall, to prevent the atmosphere immediately adjacent the outer surface thereof from becoming contaminated by the vapor escaping therefrom. Since it is desired to determine the difference between the partial pressure of the vapor inside the chamber and that of the vapor in the outside air being tested, and since the instrument measures only the drop in partial pressure of the vapor between the inner and outer surfaces of the porous wall, it is obvious that unless the vapor content of the atmosphere in contact with the outer surface of the wall is substantially the same as that at a distance therefrom, or, in other words, unless the composition of the surrounding outer atmosphere is substantially uniform, a serious error will result.

I have found that, by making the porous wall of relatively small area, this substantial uniformity can be achieved without the use of a fan. The smaller the area, the less the contamination, because the vapor is rapidly diffused and mixed with the surrounding air, and if the area is made small enough, the error due to contamination can be reduced to a point where it is rendered practically negligible.

Inasmuch as the partial pressure exerted by a saturated water vapor in an atmosphere varies very materially with the temperature of the atmosphere, it is necessary to correct the readings of the partial pressure before the relative humidity may be determined at any given temperature.

One form of automatic means which may be provided for correcting these partial pressure readings for the existing atmosphere temperature is shown in Fig. 1. A drum 13 is mounted on a vertical axis in suitable bearings 14 directly behind the manometer tube. The drum 13 has a chart 15 mounted on the surface thereof and adapted as the drum rotates to pass directly behind the manometer tube. The nature of this chart and the manner in which it is read will be explained more fully hereafter.

A suitable thermostatic device illustrated as the bimetallic element 16 has one end mounted on a fixed support 17 and the other end secured to a flexible band 18 passing around and secured to a pulley 19 formed on the end of the drum 13. This serves to rotate the drum in accordance with temperature changes in the atmosphere. The drum is connected to its shaft by means of a spiral spring 19a which maintains a slight uniform tension on the band 18 and tends to wind this band upon the pulley. Therefore, upon movement of the thermostatic element of Fig. 1 to the right the band will be unwound from the drum and upon movement in the other direction, the spring 19a will cause a rotation of the drum in the opposite direction and a rewinding of the band upon the pulley.

The chart which is mounted on the surface of the drum of Fig. 1 has running axially of the drum temperature lines which are spaced in accordance with the calibration of the particular thermostatic element being used so that, throughout the chart the proper temperature line for the temperature of the atmosphere will be brought into position behind the manometer. These temperature lines are each graduated vertically in terms of relative humidity. The partial pressure exerted by a saturated vapor decreases rapidly as the temperature falls and the range of the manometric fluid is much smaller at the low temperature end of the chart. In order to facilitate interpolation, sloping circumferential curves may be drawn connecting points of equal relative humidity on the successive temperature lines.

Although the apparatus just described has been shown in an embodiment for measuring relative humidity, it is obvious that it may also be used to measure the partial pressure of other vapors present in an atmosphere or gaseous mixture such as gasolene, alcohol or volatile solvents and is not limited to exposure to ordinary atmosphere but may be used for installations in closed chambers containing gases, and many other applications. In order to measure other vapors with the device, all that is necessary is to substitute for the water in the reservoir 3 of Figure 1, the particular liquid, the partial vapor pressure of whose vapor, in the atmosphere, it is desired to measure. In this event, the thermostatically controlled scale may be of course dispensed with and the manometer tube suitably graduated to read directly the partial vapor pressure of the particular constituent being measured.

Figure 3:
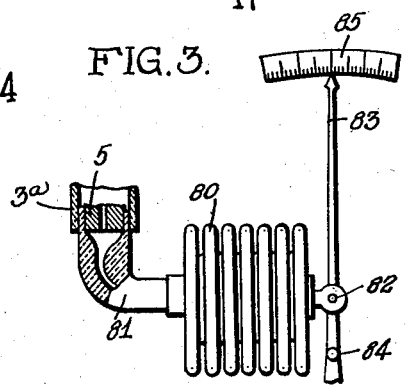
Fig. 3 illustrates a pressure responsive device adapted to be connected to the form of the invention shown in Fig. 1 in place of the manometer tube.

In Fig. 3, is shown a sensitive fluid pressure responsive device 80 comprising a corrugated elastic metallic bellows, connected by means of an elbow 81 to the neck 3a connecting with the chamber of the reservoir 3. The fluid pressure responsive device may be filled with the atmosphere existing within the instrument chamber or may be filled with a suitable liquid. In case liquid is used, it is apparent that a suitable balancing reservoir such as 7a in Fig. 1 must be provided. In any event, it will be apparent that differences in the partial pressure of the vapor within the chamber and that outside the chamber will act on the sensitive fluid pressure responsive device 80, in order to effect a contraction or expansion thereof. The end of the fluid pressure responsive device 80 is pivotally connected at 82 to an indicating hand 83, which in turn is pivoted to a fixed support 84. It will be apparent that the expansion and contraction of the bellows 80 will cause an oscillating movement of the indicating hand 83. This indicating hand may be mounted to pass over a suitably graduated scale 85, which will indicate the difference in partial vapor pressure of the particular constituent being measured, inside and outside the instrument.

It has been found highly desirable to utilize the sensitive instruments described in the foregoing in connection with means for controlling partial vapor pressure conditions. One satisfactory manner in which this may be accomplished is illustrated more or less diagrammatically in Fig. 4. Tha manometer tube 65, a portion of which is shown in this figure, may be substituted for the manometer of Fig. 1.

The manometer 65 is provided with a branch 66 communicating with the lower portion of the manometer tube. This branch 66 connects with a metallic bellows 67 or similar highly sensitive fluid pressure responsive device, such as shown in Fig. 3. The opposite end of the bellows 67 is pivotally connected to an arm 68 adjacent a stationary pivot 69 of said arm. It will be apparent that even slight fluctuations in pressure in the manometer tube will be transmitted through the connection 66 and will effect an expansion or contraction of the fluid pressure responsive device 67 and move the arm 68 slightly about its pivot 69. The movement of this arm is magnified by extending it a substantial distance. The arm is provided at its end with a contact portion 70. The relative position of the contact portion of the arm 70 is maintained by means of a light spring 71 adjustably secured in a stationary mounting 72, by means of a set screw 73. On either side of the contact portion of the arm 68 are a pair of stationary contacts 74 and 75, which serve to make electrical contact with the portion of the arm 70 as it is moved slightly in either direction. These contacts 74 and 75 are preferably made adjustable, as illustrated by being screw threaded in their mountings.

One side of an electric circuit is connected to the arm 68, by means of a wire 76. The contacts 74 and 75 each have leads 77 and 78 connected thereto. It will be apparent that the electric circuits thus completed may be used to control the humidity of a given atmosphere, by supplying or extracting moisture as required.

After the contact arm 68 has been adjusted to a proper position intermediate the contacts 74 and 75 by means of the set screw 73, it will be seen that any deviation of relative humidity from the normal to which the instrument has been adjusted will cause either an expansion or contraction of the fluid pressure responsive device 67. In case this device is expanded, it will cause a movement of the arm 68 to the right until this arm engages the contact 74. Likewise, if the condition of the atmosphere changes to diminish the pressure in the manometer column 65, the fluid pressure responsive device 67 will contract until the circuit through wires 76 and 77 is completed as the result of the arm 68 engaging the contact 75. It is readily apparent that this circuit closing device may be used in connection with any well known conventional means for correcting the atmospheric condition.

Such means for correcting atmospheric conditions are well known and it is not thought necessary to illustrate them in detail herein.

Figure 2:
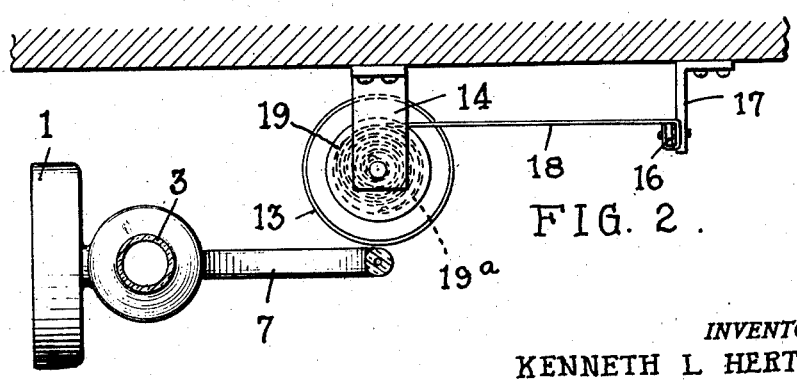
Fig. 2 is a transverse section of the instrument shown in Fig. 1, taken on the line 2—2 of Fig. 1, looking in the direction of the arrows.

I have shown an embodiment in Fig. 5 which has substantially the same principle of operation as is shown in the instrument of Figs. 1 and 2, but is adapted for measuring the partial pressure of a vapor in an atmosphere existing in a mass of solid or semi-fluent material. A relatively long cylindrical porous wall 35, of material similar to that used in the porous wall 2 of Fig. 1, encloses a chamber 36. This chamber 36 is closed at its lower end by means of a pointed plug 37, which facilitates the insertion of the chamber into the material.

A porous walled cylindrical reservoir 38 is mounted within the chamber 36, and filled with a suitable wick or absorbent material 39. The reservoir 38 is preferably permanently closed at its uper end and adapted to be filled through the opening which is closed by the plug 37 at its lower end. It will be seen that when the wick 39 within the reservoir 38 is thoroughly moistened with water or other desired liquid, the liquid will pass through the porous wall of the reservoir 38 and maintain the atmosphere in the chamber 36 in vapor saturated condition.

A tube 40 communicates with the upper end of the chamber 36 and extends upwardly and is bent to form a manometer 41.

While the manometer 7 shown in Fig. 1 is provided with a reservoir at one end which is sufficiently large so that fluctuation in the height of fluid in the other arm will not materially change the level of the manometric fluid in the reservoir, the manometer 41 is of substantially uniform diameter throughout and hence readings taken must be of the difference in level of the two arms rather than of merely the level of one arm.

While the embodiments of the invention just described and illustrated in Figs. 1 to 5 inclusive of the drawings each show a form of the invention in which the atmosphere within the chamber may be maintained in a saturated condition, it will be understood that this is not absolutely necessary for the proper functioning of the instrument. It has been apparent from the foregoing that the chief essential to bring about the proper functioning of the instrument is to maintain the atmosphere within the chamber at a known constant condition or one which may be easily and accurately determined. The instruments just illustrated and described by way of example embody an atmosphere which may be maintained substantially one hundred percent saturated at all times, and hence the readings taken from the manometer will indicate the extent to which the partial pressure of the vapor in the atmosphere outside is less than that of the saturated atmosphere inside.

In the instruments shown in Figs. 6 and 7, embodying the present invention, although the general principle is substantially the same as those just described in that they consist of a porous walled chamber in which is maintained at atmosphere of a constant or known condition, these two instruments maintain a standard partial vapor pressure substantially less than saturated.

The instrument shown in Fig. 6 comprises a reservoir 45 perhaps one-third filled with sulphuric acid 46. Submerged in this solution is a suitable porous wick 47, made of earthenware or some similar material which will draw the acid 46 up through it by capillary attraction and maintain the upper usrface 47ª moist with acid at all times.

The surface 47ª forms the bottom of the chamber 48 of the instrument which is walled in by the cover 49, and has a porous wall 50 of substantially the same material as the porous walls of the instruments described in connection with the preceding figures.

A pair of acid resisting wires 51 and 52, such as platinum, are wrapped around the upper portion of the wick out of electrical contact with each other and having their ends extending downwardly into the acid bath 46. The wire 51 is connected by means of a lead 53 to one side of a suitable source of electric current, not shown. The wire 52 is connected by means of the lead 54 to the other side of the same source of electric current.

The reservoir 45 is provided in its side wall above the surface level of the acid with a suitable air vent 55, which permits the escape of gas generated within the reservoir.

Thus electrolytic action takes place within the wick as well as within the acid in the reservoir, and any gaseous products thereof which pass into the chamber 48 will diffuse out through the porous wall 50.

The chamber 48 has an opening 56 communicating with a manometer 57 similar to the manometers described in connection with the preceding embodiments.

It will be seen from the foregoing that the sulphuric acid on the exposed surface of the wick 47ª will tend to absorb all traces of moisture from the atmosphere within the chamber 48. As this moisture is absorbed, it will tend to dilute the acid. However, the acid is continually maintained in substantially undiluted form as a result of the electrolysis set up by the current flowing between the wires 51 and 52. This electrolysis breaks the water up into hydrogen and oxygen, which as gases are permitted to pass off through the vent 55. It will therefore be seen that the atmosphere within the chamber 48 is continuously and at all times maintained susbtantially free from moisture, and that as the relatively more humid air surrounding the chamber diffuses through the porous wall 50, the moisture therefrom will be absorbed by the acid in the wick 47. It is also clear that the manometer will therefore register the difference in the partial vapor pressure between the atmosphere within the chamber and the atmosphere outside the chamber and inasmuch as the partial pressure of the water vapor within the chamber is maintained continuously at a low determinable constant, the partial pressure outside will be greater, and it is a relatively simple matter to compute the relative humidity or absolute humidity of the surrounding air by means of the manometer readings.

In the embodiment shown in Fig. 7 of the drawings, a chamber 60 is provided and maintained partially full of a saturated chemical solution 61, which will continuously absorb a known or determinable portion of the moisture in the air within the chamber. This chamber is separably connected by any suitable means, such as the screw collar 62, with a pressure responsive device such as a manometer 63, which has one end exposed to the atmosphere outside the chamber and the other end connected with the atmosphere within the chamber, and which will therefore indicated the difference in pressure between the two atmospheres. The chamber 60 is sealed except for a porous wall 64, which permits a slow diffusion of the atmospheres in the chamber and outside thereof. The chemical solution contained in the chamber may be any suitable solution which will serve to maintain the atmosphere therein at a definite degree of saturation, this degree varying with the temperature. (See International Critical Tables, vol. 1, page 67, 1926). Many metallic salts and other compounds possess this property. By way of illustration, the chamber may be partially filled with a saturated solution of calcium nitrate having an excess of solid material, which has been found to maintain a relative humidity inside the chamber of about fifty-five percent at ordinary room temperatures. The readings of the manometer will therefore indicate any deviation from this condition of known relative humidity, because any fluctuations of the partial pressure of the water vapor outside the chamber will tend to force the column of the manometer in one direction or the other as the partial pressure of the water vapor within the chamber is continuously maintained at a constant at all times, so long as the temperature does not vary.

In order to render the manometer readings independent of temperature changes, a chart and compensating thermostatic device such as shown in Fig. 1 may, of course, be employed in connection with the device of Fig. 7, if desired.

The device shown in Fig. 7 is particularly adapted for use where it is desired to maintain the relative humidity of a given atmosphere at substantially a constant, any deviation from the constant immediately affecting the pressure responsive device or manometer column. When the device is thus used, it constitutes what I designate a "predetermined instrument", and it is obvious that, under these conditions, the partial pressure of the vapor in the space above the surface of the liquid is substantially the same as that in the outer air. By selecting a suitable chemical, it is possible to maintain within the chamber any desired partial vapor pressure, corresponding with the particular outside partial vapor pressure which is to be controlled. In this embodiment of the invention, it is clear that as the chemical solution becomes exhausted, it may be replenished at will. To make the device portable, without danger of spilling, the solution may be contained in a mass of absorbent material.

The excess salt or solid material in the solution assures a saturated solution at all times despite the fact that additional water may be absorbed from the atmosphere. It is obvious that the absorbent material 39 of Fig. 5 may be saturated with a suitable chemical solution, as mentioned immediately above, instead of plain water, and in this case the device will operate as described in connection with Fig. 7.

Also, the apparatus of Fig. 1 may, of course, be filled with any desired saturated chemical solution, instead of water or other simple liquid, and this will serve to maintain the atmosphere within the chamber 1 at a known degree of saturation substantially less than 100%.

It is also obvious that an electric circuit arrangement such as shown in Fig. 4 may be used in connection with a "predetermined instrument" of the chemical solution type, such as illustrated in Fig. 7, to control the vapor conditions or humidity of the surrounding atmosphere.

It is apparent from the foregoing that although numerous structurally different embodiments of the invention have been illustrated, each of the forms have certain features in common, that is, each embodiment comprises some fluid pressure responsive device for indicating or reacting to very slight differences between the atmospheric pressure within the chamber and the atmospheric pressure surrounding the instrument. Each of the embodiments of the invention also comprises means for maintaining the atmosphere within the instrument in a standard or known condition of saturation with respect to the particular constituent of the atmosphere which it is desired to measure.

It is obvious from the foregoing that the invention is susceptible of numerous other modifications which should be apparent to those skilled in the art.

What I claim is:

1. An instrument for indicating the partial pressure of water vapor in an atmosphere, comprising a closed chamber, said chamber having a porous wall exposed to said atmosphere, means for constantly absorbing water vapor from the atmosphere within said chamber and means for continuously maintaining said absorbing means active, and pressure responsive means for indicating the difference in pressure between the atmosphere within said chamber and said first mentioned atmosphere.

2. An instrument for indicating the partial pressure of a vapor in an atmosphere, comprising a closed chamber having a porous wall through which said atmosphere may diffuse, means within said chamber for continuously maintaining the atmosphere therein at a known degree of saturation substantially less than 100% and means for indicating the difference between the pressure of the atmosphere within said chamber and the atmosphere outside said chamber.

3. An instrument functioning by virtue of the partial pressure of a vapor in an atmosphere, said instrument comprising a closed chamber having a porous wall exposed to said atmosphere, a saturated aqueous chemical solution in said chamber for maintaining the atmosphere therein at a constant degree of humidity at a given temperature, said wall being out of contact with said solution, and movable means responsive to the difference in pressures between the atmospheres within and outside of said chamber.

4. An instrument functioning by virtue of the partial pressure of a vapor in an atmosphere, said instrument comprising a closed chamber having a porous wall exposed to said atmosphere, through which wall said atmosphere may diffuse, means for maintaining the atmosphere within said chamber, at a constant known degree of saturation substantially less than 100%, for any given temperature, and means movable in response to variations in the difference in pressure between the atmospheres inside and outside of said chamber.

5. An instrument functioning by virtue of the partial pressure of a vapor in an atmosphere, said instrument comprising a closed chamber having a porous wall exposed to said atmosphere, through which wall said atmosphere may continuously diffuse, an aqueous chemical solution partially filling said chamber and having the property of maintaining the atmosphere therein at a constant, definite degree of saturation for any given temperature, and movable means responsive to the difference in pressure between the atmospheres inside and outside of said chamber.

KENNETH L. HERTEL.